US007325058B1

(12) United States Patent
Sheth et al.

(10) Patent No.: US 7,325,058 B1
(45) Date of Patent: Jan. 29, 2008

(54) METHOD AND SYSTEM FOR CONTROLLING SUBSCRIBER ACCESS IN A NETWORK CAPABLE OF ESTABLISHING CONNECTIONS WITH A PLURALITY OF DOMAIN SITES

(75) Inventors: Purnam Anil Sheth, Livermore, CA (US); Aravind Sitaraman, Bangalore (IN); Charles T. Yager, Cupertino, CA (US); Gregory D. Burns, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 672 days.

(21) Appl. No.: 09/712,005

(22) Filed: Nov. 13, 2000

(51) Int. Cl.
*G06F 15/16* (2006.01)
*G06F 15/173* (2006.01)

(52) U.S. Cl. .................. 709/225; 709/223; 709/224; 709/227; 709/229

(58) Field of Classification Search .............. 709/208, 709/224, 225, 223, 229, 227; 370/401, 420, 370/352
See application file for complete search history.

(56) References Cited

U.S. PATENT DOCUMENTS

| | | | |
|---|---|---|---|
| 4,644,532 A | 2/1987 | George et al. ............... 370/94 |
| 4,669,113 A | 5/1987 | Ash et al. .................... 379/221 |
| 4,896,319 A | 1/1990 | Lidinsky et al. |
| 4,995,074 A | 2/1991 | Goldman et al. |
| 5,014,265 A | 5/1991 | Hahne et al. ................. 370/60 |
| 5,115,427 A | 5/1992 | Johnson, Jr. et al. |
| 5,159,592 A | 10/1992 | Perkins ....................... 370/85.7 |
| 5,239,537 A | 8/1993 | Sakauchi |
| 5,265,245 A | 11/1993 | Nordstrom et al. ......... 395/600 |
| 5,274,634 A | 12/1993 | Babiarz ....................... 370/60 |
| 5,274,643 A | 12/1993 | Fisk ............................ 370/94.1 |
| 5,280,470 A | 1/1994 | Buhrké et al. ............... 370/13 |

(Continued)

FOREIGN PATENT DOCUMENTS

WO 99/23852 5/1999

OTHER PUBLICATIONS

"Microsoft Computer Dictionary—Fifth Edition", Microsoft Press 2002, p. 172.*

(Continued)

*Primary Examiner*—Quang N. Nguyen
(74) *Attorney, Agent, or Firm*—Thelen Reid Brown Raysman & Steiner LLP

(57) ABSTRACT

A method for controlling subscriber access in a network capable of establishing connections with a plurality of domains includes receiving a communication from a subscriber using a first communication network coupled to at least one other communication network, the communication optionally including a domain identifier associated with a domain on the at least one other communication network, determining whether the subscriber is authorized to access the domain based upon the domain identifier and a list of authorized domains for a virtual circuit used to receive the communication and authorizing subscriber access to the domain when the domain identifier is included in the list. An access server includes a tunnel ID request generator and an authorizer. The tunnel ID request generator generates a tunnel ID request that includes a virtual circuit identifier associated with a virtual circuit used to accept a PPP authentication request. The authorizer grants subscribers domain access based upon a list of authorized domains for the virtual circuit.

15 Claims, 12 Drawing Sheets

U.S. PATENT DOCUMENTS

| | | | |
|---|---|---|---|
| 5,305,311 A | 4/1994 | Lyles | 370/60 |
| 5,347,511 A | 9/1994 | Gun | 370/54 |
| 5,371,852 A | 12/1994 | Attanasio et al. | 395/200 |
| 5,406,643 A | 4/1995 | Burke et al. | |
| 5,408,469 A | 4/1995 | Opher et al. | 370/60.1 |
| 5,416,842 A | 5/1995 | Aziz | 380/30 |
| 5,422,882 A | 6/1995 | Hiller et al. | 370/60.1 |
| 5,426,636 A | 6/1995 | Hiller et al. | 370/60.1 |
| 5,428,607 A | 6/1995 | Hiller et al. | 370/60.1 |
| 5,430,715 A | 7/1995 | Corbalis et al. | 370/54 |
| 5,437,013 A | 7/1995 | Rubin et al. | 395/200 |
| 5,452,297 A | 9/1995 | Hiller et al. | 370/60.1 |
| 5,461,624 A | 10/1995 | Mazzola | |
| 5,469,556 A * | 11/1995 | Clifton | 711/163 |
| 5,510,777 A | 4/1996 | Pilc et al. | |
| 5,539,884 A | 7/1996 | Robrock, II | |
| 5,555,244 A | 9/1996 | Gupta et al. | 370/60.1 |
| 5,570,361 A | 10/1996 | Norizuki et al. | 370/60.1 |
| 5,578,955 A | 11/1996 | Matsue et al. | 327/292 |
| 5,583,862 A | 12/1996 | Callon | 370/397 |
| 5,588,003 A | 12/1996 | Ohba et al. | |
| 5,602,918 A | 2/1997 | Chen et al. | 380/21 |
| 5,604,803 A | 2/1997 | Aziz | 380/25 |
| 5,617,417 A | 4/1997 | Sathe et al. | |
| 5,621,721 A | 4/1997 | Vatuone | 370/16 |
| 5,623,605 A | 4/1997 | Keshav et al. | 395/200.17 |
| 5,631,897 A | 5/1997 | Pacheco et al. | 370/237 |
| 5,642,515 A | 6/1997 | Jones et al. | 395/727 |
| 5,649,108 A | 7/1997 | Spiegel et al. | |
| 5,655,077 A | 8/1997 | Jones et al. | 395/187.01 |
| 5,671,354 A | 9/1997 | Ito et al. | 395/187.01 |
| 5,673,265 A | 9/1997 | Gupta et al. | |
| 5,684,950 A | 11/1997 | Dare et al. | 395/187.01 |
| 5,689,566 A | 11/1997 | Nguyen | 380/25 |
| 5,708,812 A * | 1/1998 | Van Dyke et al. | 717/171 |
| 5,715,399 A | 2/1998 | Bezos | 395/227 |
| 5,717,690 A | 2/1998 | Peirce, Jr. et al. | 370/389 |
| 5,734,654 A | 3/1998 | Shirai et al. | 370/396 |
| 5,740,171 A | 4/1998 | Mazzola et al. | |
| 5,740,176 A | 4/1998 | Gupta et al. | |
| 5,740,371 A | 4/1998 | Wallis | 395/200.59 |
| 5,742,604 A | 4/1998 | Edsall et al. | |
| 5,745,708 A | 4/1998 | Weppler et al. | 395/299 |
| 5,764,636 A | 6/1998 | Edsall | |
| 5,768,519 A * | 6/1998 | Swift et al. | 709/223 |
| 5,796,732 A | 8/1998 | Mazzola et al. | |
| 5,802,290 A | 9/1998 | Casselman | 395/200.31 |
| 5,815,665 A | 9/1998 | Teper et al. | 395/200.59 |
| 5,852,607 A | 12/1998 | Chin | 370/401 |
| 5,864,542 A | 1/1999 | Gupta et al. | 370/257 |
| 5,918,019 A | 6/1999 | Valencia | 395/200.57 |
| 5,944,824 A | 8/1999 | He | 713/201 |
| 5,949,755 A | 9/1999 | Uphadya et al. | |
| 5,991,828 A | 11/1999 | Horie et al. | 710/8 |
| 5,999,514 A | 12/1999 | Kato | |
| 5,999,518 A | 12/1999 | Nattkemper | |
| 6,009,103 A | 12/1999 | Woundy | 370/401 |
| 6,011,910 A | 1/2000 | Chau et al. | 395/200.59 |
| 6,021,496 A | 2/2000 | Dutcher et al. | 713/202 |
| 6,023,474 A | 2/2000 | Gardner et al. | |
| 6,026,441 A | 2/2000 | Ronen | 709/227 |
| 6,044,402 A * | 3/2000 | Jacobson et al. | 709/225 |
| 6,047,376 A | 4/2000 | Hosoe | 713/201 |
| 6,061,650 A | 5/2000 | Malkin et al. | |
| 6,069,895 A | 5/2000 | Ayandeh | |
| 6,078,957 A | 6/2000 | Adelman et al. | |
| 6,081,508 A | 6/2000 | West et al. | |
| 6,081,518 A | 6/2000 | Bowman-Amuah | |
| 6,084,892 A | 7/2000 | Benash et al. | |
| 6,091,951 A | 7/2000 | Sturniolo et al. | 455/432 |
| 6,092,178 A | 7/2000 | Jindal et al. | 712/27 |
| 6,092,196 A | 7/2000 | Reiche | 713/200 |
| 6,094,437 A * | 7/2000 | Loehndorf et al. | 370/420 |
| 6,108,708 A | 8/2000 | Iwata | |
| 6,115,468 A | 9/2000 | De Nicolo | |
| 6,118,785 A * | 9/2000 | Araujo et al. | 370/401 |
| 6,119,160 A * | 9/2000 | Zhang et al. | 709/224 |
| 6,134,666 A | 10/2000 | De Nicolo | |
| 6,154,775 A | 11/2000 | Coss et al. | |
| 6,212,561 B1 * | 4/2001 | Sitaraman et al. | 709/225 |
| 6,236,655 B1 | 5/2001 | Caldara et al. | |
| 6,252,878 B1 | 6/2001 | Locklear, Jr. et al. | |
| 6,266,699 B1 * | 7/2001 | Sevcik | 709/229 |
| 6,298,043 B1 | 10/2001 | Mauger et al. | |
| 6,301,229 B1 | 10/2001 | Araujo et al. | |
| 6,301,618 B1 * | 10/2001 | Sitaraman et al. | 709/227 |
| 6,308,213 B1 | 10/2001 | Valencia | 709/229 |
| 6,324,648 B1 * | 11/2001 | Grantges, Jr. | 709/229 |
| 6,396,838 B1 | 5/2002 | Palnati | |
| 6,400,716 B1 | 6/2002 | Munakata et al. | |
| 6,408,336 B1 * | 6/2002 | Schneider et al. | 709/229 |
| 6,412,003 B1 | 6/2002 | Melen | |
| 6,415,313 B1 | 7/2002 | Yamada et al. | |
| 6,430,152 B1 | 8/2002 | Jones et al. | |
| 6,434,156 B1 | 8/2002 | Yeh | |
| 6,438,612 B1 | 8/2002 | Ylonen et al. | |
| 6,446,200 B1 | 9/2002 | Ball et al. | |
| 6,456,623 B1 | 9/2002 | Kobayasi et al. | |
| 6,463,475 B1 | 10/2002 | Calhoun | |
| 6,466,976 B1 * | 10/2002 | Alles et al. | 709/224 |
| 6,490,273 B1 * | 12/2002 | DeNap et al. | 370/352 |
| 6,498,845 B1 | 12/2002 | Martz et al. | |
| 6,507,577 B1 | 1/2003 | Mauger et al. | |
| 6,519,254 B1 | 2/2003 | Chuah et al. | |
| 6,522,627 B1 | 2/2003 | Mauger | |
| 6,526,033 B1 | 2/2003 | Wang et al. | |
| 6,542,919 B1 * | 4/2003 | Wendorf et al. | 709/100 |
| 6,597,689 B1 | 7/2003 | Chiu et al. | |
| 6,609,153 B1 | 8/2003 | Salkewicz | |
| 6,614,809 B1 | 9/2003 | Verma et al. | |
| 6,615,358 B1 | 9/2003 | Dowd et al. | |
| 6,651,096 B1 | 11/2003 | Gai et al. | |
| 6,654,792 B1 * | 11/2003 | Verma et al. | 709/208 |
| 6,665,273 B1 | 12/2003 | Goguen et al. | |
| 6,665,305 B1 | 12/2003 | Weismann | |
| 6,717,944 B1 | 4/2004 | Bryden et al. | |
| 6,741,599 B1 | 5/2004 | Dunn et al. | |
| 6,785,228 B1 | 8/2004 | Vandette et al. | |
| 6,792,457 B1 * | 9/2004 | Zhang et al. | 709/224 |
| 2002/0016501 A1 | 2/2002 | Okoshi et al. | |

OTHER PUBLICATIONS

David Allan, "Semi Permanent PPP Connections (sP⁴)", Nortel Networks, pp. 1-7, Feb. 8-11, 2000.

Christoph L. Schuba et al., "Countering Abuse of Name-Based Authentication", COAST Laboratory, Department of Computer Sciences, Purdue University, date unknown, 21 pages.

David R. Safford et al., "Secure RPC Authentication (SRA) for TELNET and FTP", USENIX Association, 1993.

Xu et al., "Design and Evaluation of a High-Performance ATM Firewall Switch and its Applications", IEEE Journal on Selected Areas in Communications, vol. 17, No. 6, pp. 1190-1200, Jun. 1999.

"Cisco Asymmetric Digital Subscriber Line Services Architecture", Cisco Systems, White Paper, printed from http://www.cisco.com/warp/public/cc/so/neso/dsso/global/adsl_wp.htm on Sep. 27, 2000.

Cisco, Product Bulletin—No. 1120, Cisco 6400 Universal Access Concentrator, printed from http://www.cisco.com/warp/public/cc/pd/as/6400/prodlit/1120_pp.htm on Oct. 4, 2000.

Cisco, "Layer 2 Tunnel Protocol", Release 12.0(1)T and 11.3(5)AA, 53 pages, on Sep. 3, 2000.

"Cisco 6400 Access Concentrators", Cisco Systems, Inc., printed from http://www.cisco.com/warp/public/cc/pd/as/6400/index.shtml on Sep. 27, 2000.

Cisco, "Cisco 6400 Series Universal Access Concentrator", printed from http://www.cisco.com/warp/public/cc/pd/as/6400/prodlit/6400_ds.htm on Sep. 27, 2000.

"L2TP", 1998, Mecklermedia Corporation, printed from http://www.webopedia.internet.com/TERM/L/L2TP/html.

"MultiVPN from Ascend Communications: Breaking Down the Barriers to VPNs", Ascend Communications, Inc., White Paper, 1998.

Rigney, et al., "Remote Authentication Dial In User Service (RADIUS)", Network Working Group, RFC 2138, Apr. 1997, pp. 1-57.

"Tunneling", 1998, Mecklemedia Corporation, printed from http://webopedia.internet.com/TERM/t/tunneling.html.

Valencia, et al., Layer Two Tunneling Protocol "L2TP", May 1998, Cisco Systems, Inc., printed from http://www.masinter/net/~l2tp/ftp/draft-ietf-pppext-l2tp-11.txt on Sep. 21, 1998.

Carrel et al., "The TACACS+ Protocol", Jan. 1997, Cisco Systems, Version 1.78, printed from ftp://ftp-eng.cisco.com/gdweber/tac-rfc.1.78.txt on Oct. 23, 2000.

Fogarty, K. et al., "Microsoft tunnels through the Net with new protocol", *WANs & Internetworking, Network World*, pp. 19-20, Mar. 18, 1990.

Mathieson, C. et al., "High Speed Serial Communications for Control Systems", 0-7803-1203-Jan. 1993 *IEEE*, pp. 1826-1828, (1993).

Carrel, D. et al., The TACACS+ Protocol, Version 1.78, Cisco Systems, Inc., printed from ftp://ftp-eng.cisco.com/edweber/tac-rfc.1.78.txt on Oct. 23, 2000.

* cited by examiner

| Virtual Circuit ID | Domain Name |
|---|---|
| 10/2 | corpA.com corpB.com |
| 33/1 | corpA.com corpB.com corpC.com |
| 94/22 | corpC.com |

FIG. 12

| Domain Name | Tunnel ID |
|---|---|
| corpA.com | 4578 |
| corpB.com | 3948 |
| corpC.com | 2210 |

FIG. 13

METHOD AND SYSTEM FOR CONTROLLING SUBSCRIBER ACCESS IN A NETWORK CAPABLE OF ESTABLISHING CONNECTIONS WITH A PLURALITY OF DOMAIN SITES

CROSS REFERENCE TO RELATED APPLICATIONS

This application is related to the following:

U.S. patent application Ser. No. 09/488,394, filed Jan. 20, 2000 in the name of inventors Aravind Sitaramin, Aziz Abdul, Bernard Janes, Dennis Cox, John Joyce, Peter Heitman, Shujin Zhang and Rene Tio, entitled "System and Method for Identifying a Subscriber for Connection to a Communication Network", commonly assigned herewith.

U.S. patent application Ser No. 09/488,395, filed Jan. 20, 2000, now U.S. Pat. No. 7,216,175, issued May 8, 2007, in the name of inventors Aravind Sitaramin, Dennis Cox, John Joyce and Shujin Zhang, entitled "System and Method for Determining Subscriber Information", commonly assigned herewith.

U.S. patent application Ser. No. 09/712,780, filed Nov. 13, 2000, now U.S. Pat. No. 6,874,030, issued Mar. 29, 2005, in the name of inventors Purnam Sheth, Aravind Sitaraman, Charles Yager and Gregory Burns, entitled "PPP Domain Name and L2TP Tunnel Selection Configuration Override", commonly assigned herewith.

BACKGROUND OF THE INVENTION

1. Field of the Invention

The present invention relates to the field of data communications. More particularly, the present invention relates to a system and method for restricting the domains that a subscriber can visit when using Point-to-Point Protocol (PPP).

2. The Background Art

A significant concern of the individual private and public domains making up the Internet or any other system incorporating multiple networks is the ability to ensure that only those subscribers who are authorized to access the individual private and public domains within the comprehensive network have the capability to access such networks. Serious security risks are posed by the possibility of unauthorized users having the know-how and capability to invade the individual private and public domains within the network.

In today's networking environment, many privately owned domain sites exist on the Internet that allow access only to those individuals which have been granted the proper authorization. For example, these may include company owned private domains containing confidential information and, as such, the company may grant access only to those employed by the company, or they may be communities of interest (i.e. "pay-sites") that provide information only to those subscribers which subscribe to the privately owned domain. The subscriber who connects to the Internet, typically by means of an Internet Service Provider (ISP) or Telephone Company (Telco), may also possess the capability to assume the identity of an authorized user. This capability heightens the potential for security violations.

Additionally, it is becoming increasingly more prevalent for individual computer users to have the capability to remotely access privately owned intra networks. Such Virtual Private Networks (VPNs) allow the user to connect with the private intra network of the company from the user's residence by means of the telephone line or other convenient means. The inception of wireless remote connections have even made it possible for users to connect from almost any imaginable locale. The ability to connect remotely to individual private intra networks, once seen as a luxury, has become so commonplace that many working professionals require such access in order to accomplish their everyday job assignments. In many instances, remote users connect to privately owned intra networks through the same means that individuals connect to the Internet, typically Telcos or ISPs. VPNs are cost-effective because users can connect to the Internet locally and tunnel back to connect to corporate resources. This reduces overhead costs associated with traditional remote access methods.

FIG. 1 shows a simplified diagram of a computer user connected to a computer network 10 via a host computer 12 linked to an access point 14 which grants authorization to external networks or domains 16, 18 and 20. The potential for a network security violation is posed by the user having the capability through the access point 14 to reach or "Knock on the door" of home gateways 22, 24 and 26.

Still referring to FIG. 1, the user has access to the computer networks through a workstation or host computer 12. The host computer 12 has the capability to connect with the external networks through an access point 14. An access point 14 is essentially an external location capable of permitting authorized users to access external computer networks. Typically, the access point consists of a series of Network Access Servers (NASs) and other related hardware, software and/or firmware. An access point 14 may also include a modem pool (not shown) maintained by a Telephone Company (Telco) or an Internet Service Provider (ISP) which enables its authorized users or subscribers to obtain external network access through the host computer 12 which has the required dial-up connection capability. Those of ordinary skill in the art will recognize that other types of access methods may be provided by a Telcos or ISP such as frame relay, leased lines, ATM (Asynchronous Transfer Mode), ADSL (Asymmetric Digital Subscriber Line) and the like.

Typically, when the user desires to access a specified domain, such as the first privately owned secured domain site 16, the user runs a network logon application program on the host computer 12 which requires the user to input user identification and authorization information as a means of initiating access to the desired network. This information is then directed to the access point 14 where it is verified to ensure that the host user has the required authorization to permit access to the desired network. Once authorization is granted to the user, a connection is established via the access point 14 with the home gateway 22 of the specified first privately owned secure domain site 16. The connection established may be a tunnel-based connection, such as L2TP (Layer Two Tunneling Protocol) or L2F (Layer Two Forwarding), or an IP-based (Internet Protocol) connection, such as used with ATM or frame relay. The user of the host computer 12, having established such a connection, has the ongoing capability to access the specified domain until the connection is terminated either at the directive of the user or by error in data transmission. The access point 14 will typically have the capability to connect the user to various other privately owned secured domain sites, such as the second private domain site 18 or the public Internet 20. The user of the host computer 12 may use the PPP protocol to connect through the wholesaler networks to another Home Gateway.

Layer 2 Tunneling Protocol (L2TP) is used in many Virtual Private Networks (VPNs). An L2TP access concentrator (LAC) is a device that the client directly connects to and that tunnels Point-to-Point (PPP) frames to the L2TP network server (LNS). The LAC is the initiator of incoming calls and the receiver of outgoing calls. An L2TP network server (LNS) is the Termination point for an L2TP tunnel and the access point where PPP frames are processed and passed to higher layer protocols. The LNS handles the server side of the L2TP protocol. The LNS terminates calls arriving at any of the LAC's PPP interfaces, including asynchronous, synchronous and ISDN. The LNS is the initiator of outgoing calls and the receiver of incoming calls.

FIG. 2 is a block diagram that illustrates an L2TP tunnel and how a user typically connects to a privately owned domain site such as a corporate intranet. Using L2TP tunneling, an L2TP access concentrator (LAC) 100 located at the ISP's point of presence (POP) 105 exchanges PPP messages 110 with remote users 115 and communicates by way of L2TP requests and responses with the customer's L2TP network server (LNS) 120 to set up tunnels 125. The L2TP protocol passes protocol-level packets through the virtual tunnel 125 between end points of a point-to-point connection. Frames from remote users are accepted by the ISP's POP 105, stripped of any linked framing or transparency bytes, encapsulated in L2TP and forwarded over the appropriate tunnel 125. The customer's home gateway 120 accepts these L2TP frames, strips the L2TP encapsulation, and processes the incoming frames for the appropriate interface.

Turning now to FIG. 3 a block diagram that illustrates the use of AAA servers in an L2TP tunneling network is presented. The selection of the L2TP tunnel 200 at the LAC 205 or NAS is typically determined by an authentication, authorization and accounting (AAA) server 210 based upon the structured username (username@domain) in the PPP authentication packet. The AAA 210 looks up a service profile that matches the domain name string. The service profile includes the IP address of the L2TP network server (LNS) 215 and a password for the tunnel 200. Once tunnels are established, the LAC 205 forwards the subscriber's PPP session to the destination LNS 215 through the L2TP tunnel 200. The ISP or enterprise customer 220 receives new PPP sessions and authenticates the sessions using AAA server 225. Authenticated sessions are established on the LNS 215, while sessions that fail authentication are rejected.

Present methods of establishing a tunnel allow an unauthorized user to reach or "Knock on the door" of another Home Gateway 215, merely by changing the domain name provided in the PPP authentication packet to the domain name of the intended Home Gateway 215. In this scenario, all users having access to access point 205 would have the potential to reach the privately owned secured domain site. For example, a user having a domain name of xxx@corpA.com may change the domain name in the PPP authentication packet to xxx@corp:B.com, allowing the user's PPP session to be forwarded to the corpB LNS through the L2TP tunnel assigned to corpB. Allowing such unauthorized access to a Home Gateway 215 subjects the Home Gateway 215 to potential security risks, including denial of service attacks.

Denial-of-service attacks typically focus on making a service unavailable for normal use, which is often accomplished by exhausting a resource limitation on the network or within an operating system or application. When involving specific network server applications, these attacks can focus on acquiring and keeping open all of the available connections supported by that server, effectively locking out valid users of the server or service. For example, a user intending to exploit present day L2TP systems could flood the network with many PPP sessions targeted to a Home Gateway for which the user is not authorized. Although the LNS authentication process would typically prevent an unauthorized user from access to the corporate intranet, the resources devoted to handling the large number of PPP sessions could adversely affect the services available to authorized users.

The currently available solutions to this problem are very limited and do not offer the level of security protection that most companies operating secured and confidential private intra networks demand. Companies have been able to minimize the risk by setting up internal access points which effectively cause the user/host to dial-in or connect directly with the private intra network without going through an external ISP or Telco. While this direct-connect service allows some measure of security it does so at the expense of increasing the costs associated with maintaining an internal access point and the additional connection costs related to remote users having to potentially incur long distance telephone service charges.

What is needed is a solution that provides more control over which domains a particular subscriber may connect to using the PPP protocol.

BRIEF DESCRIPTION OF THE INVENTION

A method for controlling subscriber access in a network capable of establishing connections with a plurality of domains includes receiving a communication from a subscriber using a first communication network coupled to at least one other communication network, the communication optionally including a domain identifier associated with a domain on the at least one other communication network, determining whether the subscriber is authorized to access the domain based upon the domain identifier and a list of authorized domains for a virtual circuit used to receive the communication and authorizing subscriber access to the domain when the domain identifier is included in the list. An access server includes a tunnel ID request generator and an authorizer. The tunnel ID request generator generates a tunnel ID request that includes a virtual circuit identifier associated with a virtual circuit used to accept a PPP authentication request. The authorizer grants subscribers domain access based upon a list of authorized domains for the virtual circuit.

BRIEF DESCRIPTION OF THE DRAWINGS

FIG. 12 is a table that illustrates associating virtual circuit identifiers with authorized domain names in accordance with one embodiment of the present invention.

FIG. 13 is a table that illustrates associating domain names with tunnel identifiers in accordance with one embodiment of the present invention.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons having the benefit of this disclosure.

In accordance with a presently preferred embodiment of the present invention, the components, processes and/or data structures may be implemented using C++ programs running on high performance computers (such as an Enterprise 2000™ server running Sun Solaris™ as its operating system. The Enterprise 2000™ server and Sun Solaris™ operating system are products available from Sun Microsystems, Inc. of Mountain View, Calif.). Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The authentication, authorization and accounting (AAA) service performs user authentication, user authorization and user accounting functions. It may be a Cisco ACS™ product such as Cisco Secure™, available from Cisco Systems, Inc. of San Jose, Calif., or an equivalent product. In accordance with one embodiment of the present invention, the Remote Authentication Dial-In User Service (RADIUS) protocol is used as the communication protocol for carrying AAA information. RADIUS is an Internet standard track protocol for carrying authentication, authorization, accounting and configuration information between devices that desire to authenticate their links and a shared AAA or AAA proxy service. Those of ordinary skill in the art will realize that other authentication protocols such as TACACS+ or DIAMETER can be used as acceptable authentication communications links between the various communications devices that encompass the data communications network and still be within the inventive concepts disclosed herein.

Figure 1:
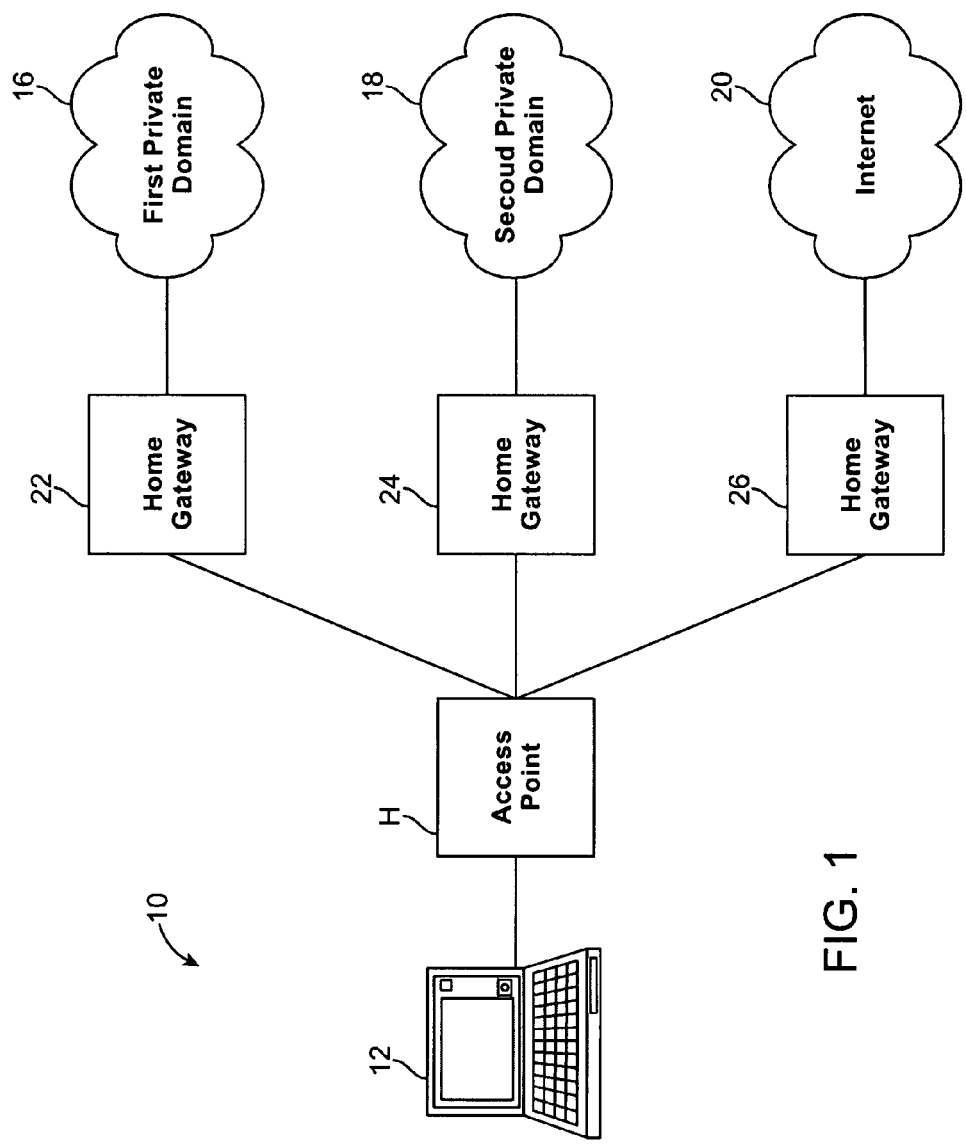
FIG. 1 is a block diagram of a computer network wherein the host computer has access to multiple domains within the network.
Figure 2:
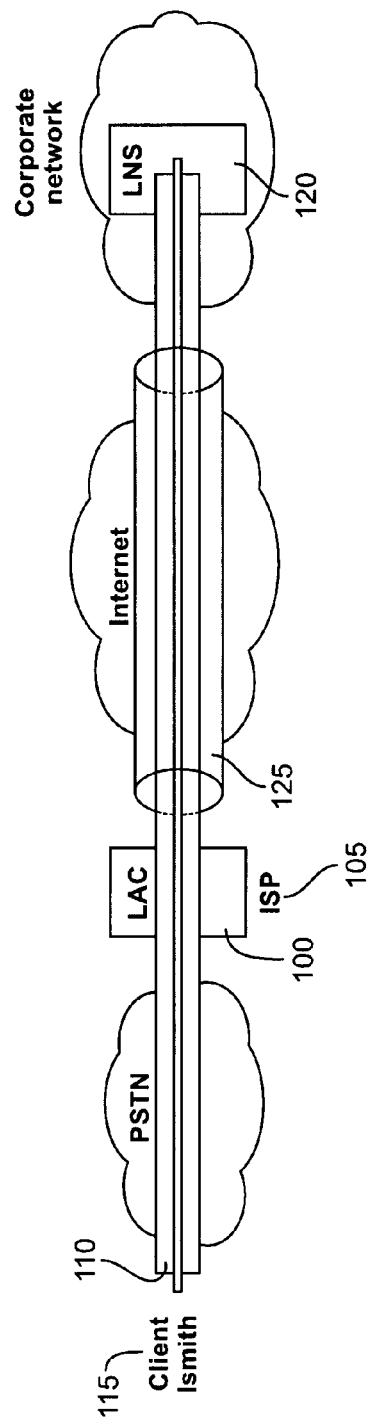
FIG. 2 is a block diagram that illustrates an L2TP tunnel and how a user typically connects to a corporate intranet.
Figure 3:
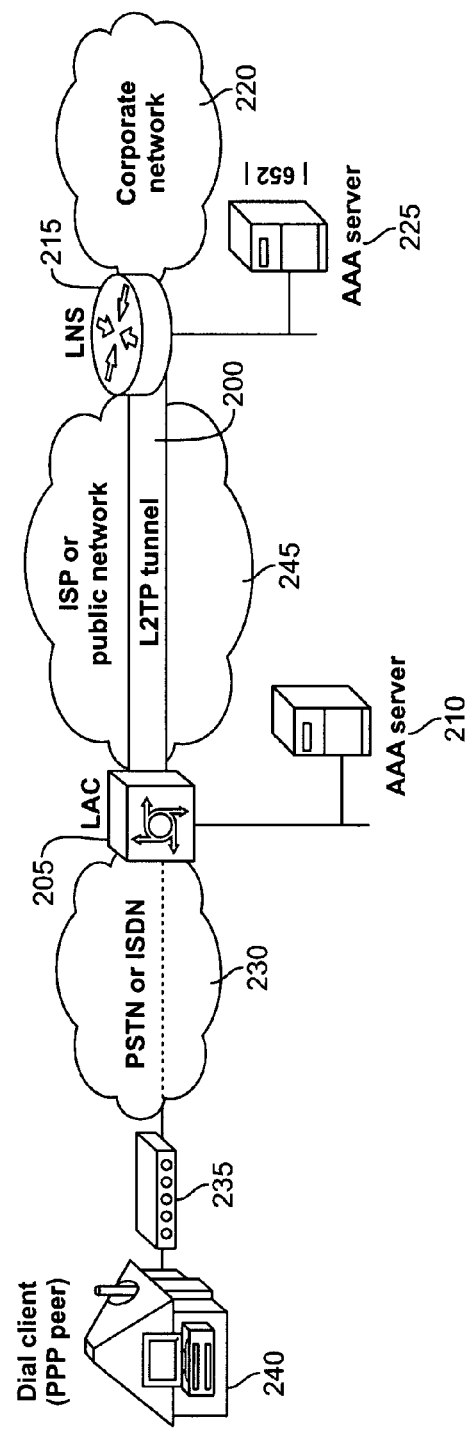
FIG. 3 is a block diagram that illustrates the use of AAA servers in an L2TP tunneling network.
Figure 4:
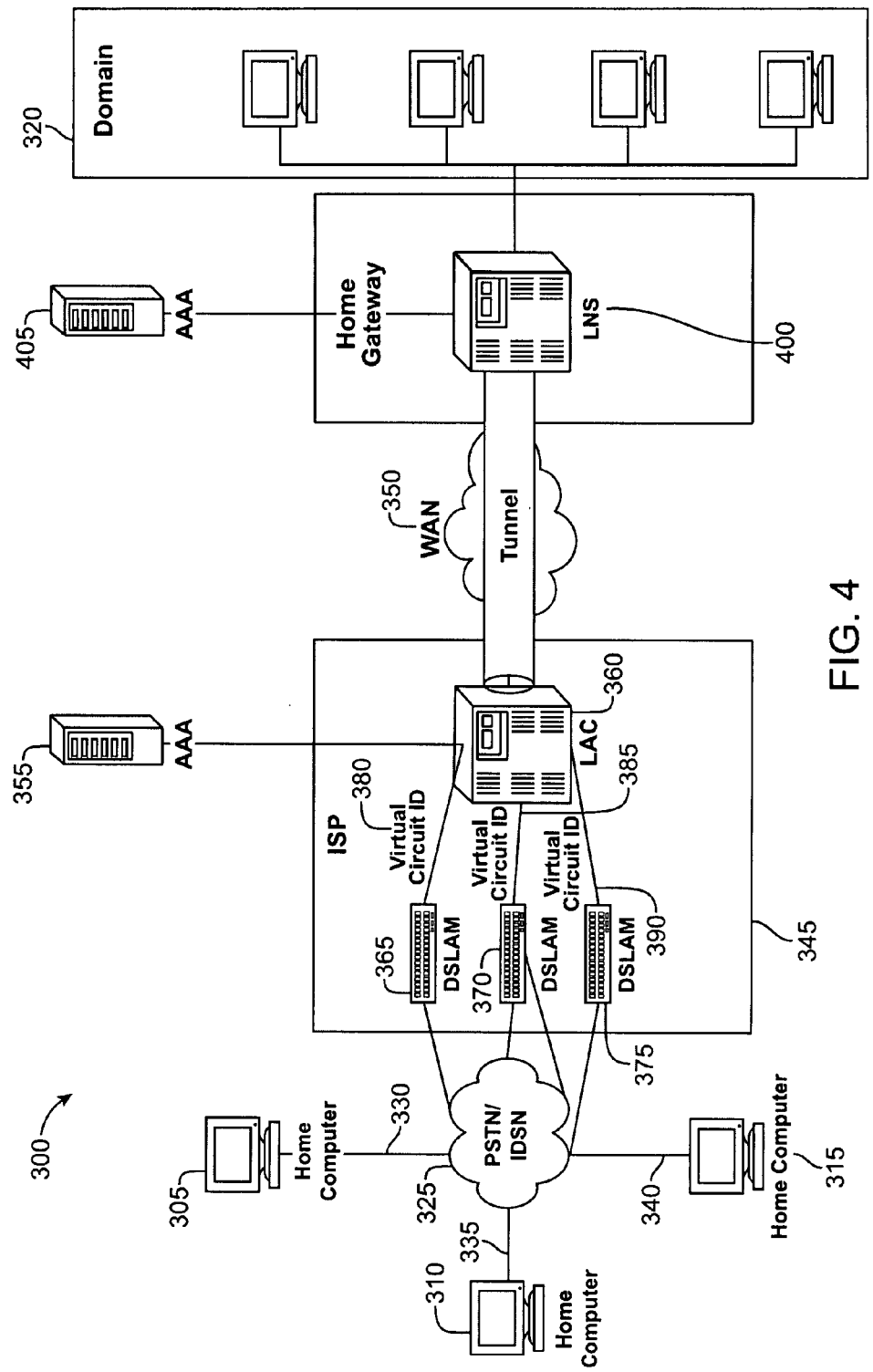
FIG. 4 is a high-level block diagram of a differentiated computer network that has the capability to limit subscriber access to the system to any domain network selected from a list of domain networks associated with a virtual circuit in accordance with one embodiment of the present invention.

Turning now to FIG. 4, a block diagram that illustrates a communication system 300 in accordance with one embodiment of the present invention is presented. Users connect to public or private domain networks within communication system 300 through host computers 305, 310, 315. The host computers 305, 310, 315 have the capability to connect or link with domain 320. Domain 320 may be a private domain or a public domain, such as the Internet or a private intra network. These links or connections are established via a series of hardware that serve to grant access to specific domains and transport data packets to and from the host computers 305, 310, 315 and domain 320.

The host computers 305, 310, 315 in this particular computer network are connected to a Publicly Switched Telephone Network (PSTN) 325 via a transmission means 330, 335, 340, such as copper wire or cable. Broadcast mechanisms such as ADSL (Asymmetric Digital Subscriber Line) may be used. Those of ordinary skill in the art will recognize that other types of broadcast mechanisms may be provided by an ISP or Telco such as Ethernet, frame relay, leased lines, ATM (Asynchronous Transfer Mode) or the like. Access points 345 are located within a wide area network (WAN) 350 and are operated by Telcos or ISPs. The access points 345 house AAA servers 355, Service Selection Gateways (not shown in FIG. 4), L2TP Access Concentrators (LACs) 360, Digital Subscriber Line Aggregation Multiplexers (DSLAMs) 365, 370, 375 or similar devices. The Service Selection Gateway (SSG) is not an integral part of the present invention and therefore a discussion related to their functionality would not benefit the discussion of the present invention. The SSG serves as a gateway between the user and public area domains, such as the Internet. In order for a user host to gain access to a public domain network, such as the Internet, users must first dial-in or otherwise make a connection with the SSG through a data-receiving interface (not shown in FIG. 5.). As a threshold matter, an authorizer (not shown in FIG. 5) within the LAC serves to authenticate the identity of the user, ensure authorization and ascertain the nature and scope of the public network services that it will provide.

According to one embodiment of the present invention, an access point 345 includes one or more DSLAMs 365, 370, 375 that service the copper loops between the access point 345 and the Customer Premises Equipment (CPE) 305, 310, 315. DSLAMs 365, 370, 375 may link locally or via an inter-central office (CO) link to LAC 360. Traffic enters and exits the DSLAM chassis through ports, each of which is assigned a port address. A virtual circuit or channel (VC) is a logical circuit created to ensure reliable communication between two network devices. A VC is defined by a Virtual Path Identifier (VPI)/Virtual Channel Identifier (VCI) pair, which is directly tied to a particular DSLAM port used by a particular subscriber.

The LAC 360 is linked to a separate server/memory device 355, herein referred to as an Authentication, Authorization and Accounting (AAA) server 355. The LAC 360 and the AAA server 355 communicate with one-another according to the Remote Access Dial-In User Service (RADIUS) protocol. The specific details of the RADIUS protocol are well known by those of ordinary skill in the art. Moreover, as will be apparent to those of ordinary skill in the art, the RADIUS protocol has limited applicability to the present invention and, therefore a detailed discussion of this protocol is deemed unnecessary. The preferred methods of the present invention described herein are not limited to the use of the RADIUS protocol and other equivalent authentication protocols may be used.

In accordance with one embodiment of the present invention, the LAC service and the LNS may be implemented using a Cisco 6400 Universal Access Concentrator, available from Cisco Systems, Inc. of San Jose, Calif.

Figure 5:
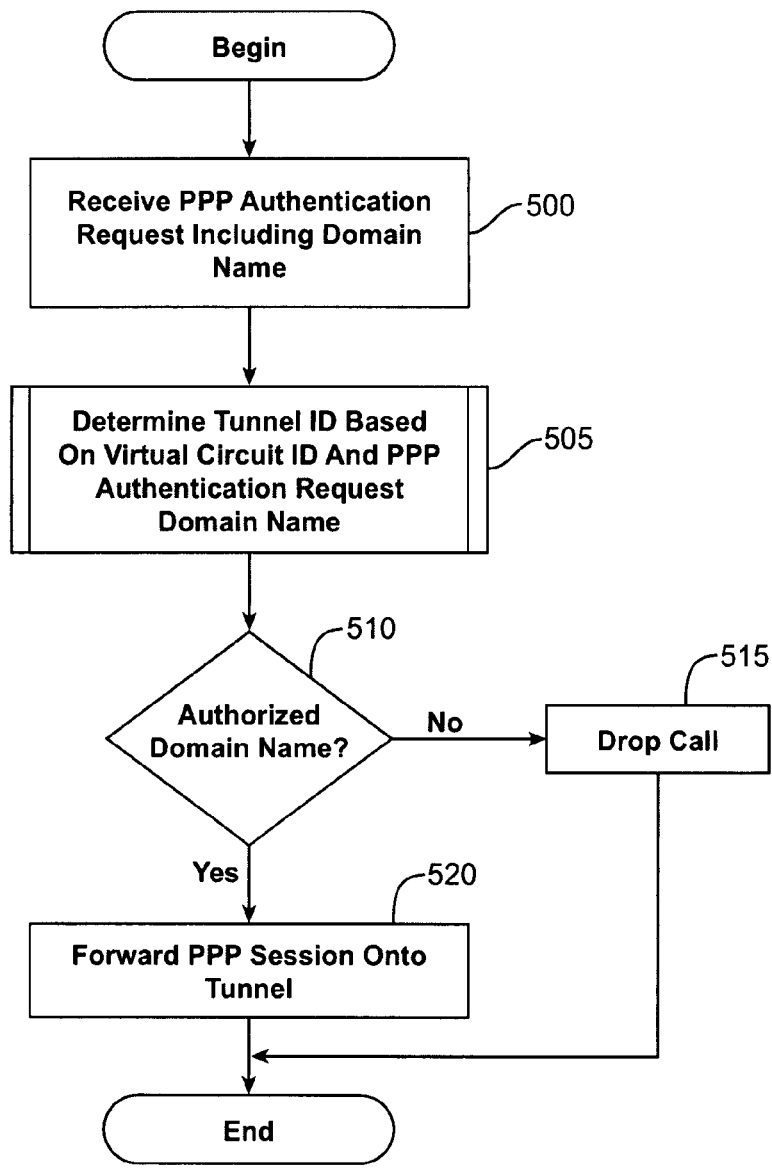
FIG. 5 is a high-level flow diagram that illustrates a method for limiting subscriber access to any domain network selected from a list of domain networks associated with a virtual circuit in accordance with one embodiment of the present invention.

Turning now to FIG. 5, a high-level flow diagram that illustrates a method for limiting subscriber access to any domain network selected from a list of domain networks associated with a virtual circuit in accordance with one embodiment of the present invention is presented. At 500, a PPP session authentication request that includes a domain name is received. At 505, a tunnel ID is determined, based upon the domain name and a virtual circuit identifier such as a VPI/VCD identifier. At 510, a determination is made regarding whether the domain name is authorized. If the domain name is unauthorized, the call is dropped at 515. If the domain is authorized, the PPP session is forwarded onto the tunnel at 520.

Figure 8:
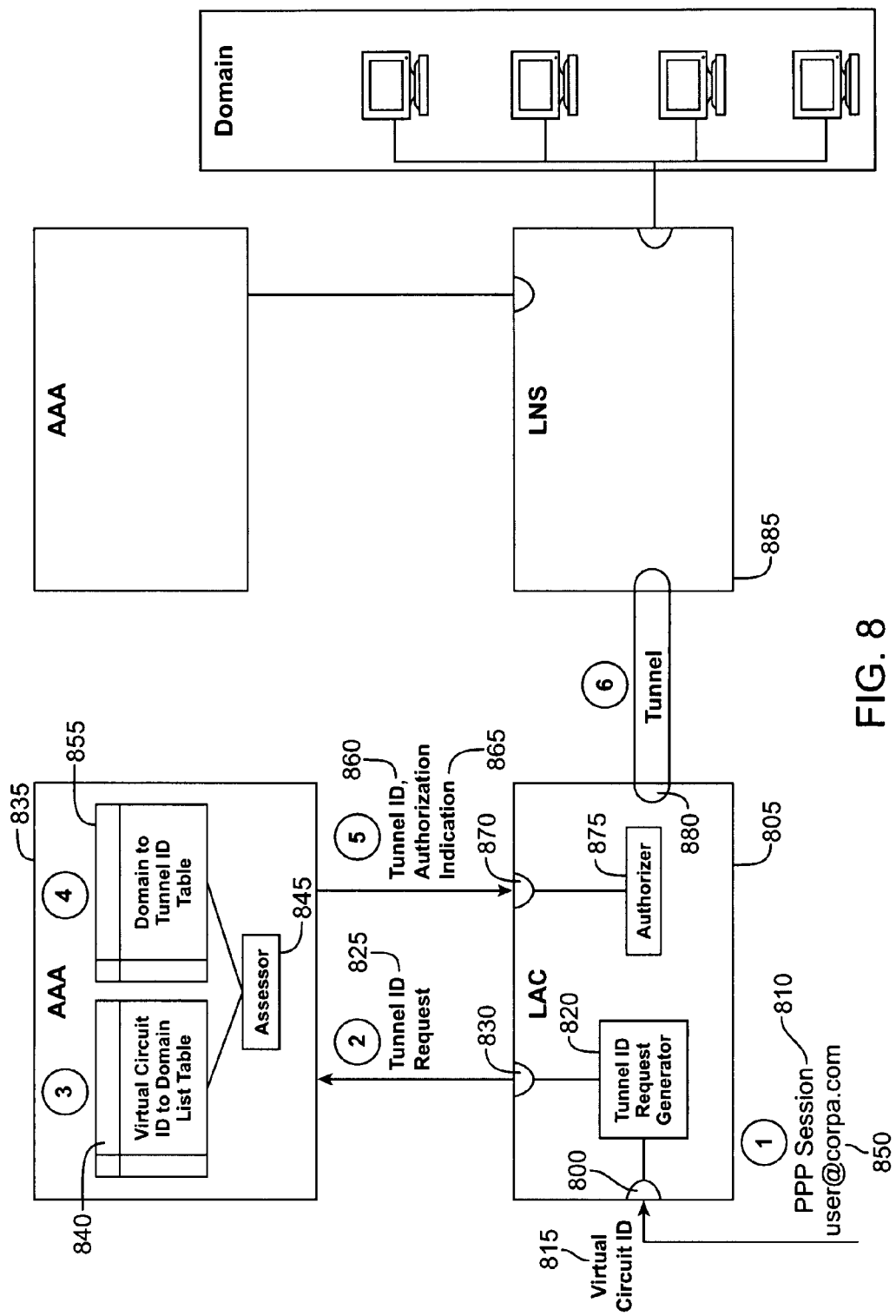
FIG. 8 is a detailed block diagram of a differentiated computer network that has the capability to limit subscriber access to the system to any domain network selected from a global list of domain networks associated with a virtual circuit in accordance with one embodiment of the present invention.
Figure 9:
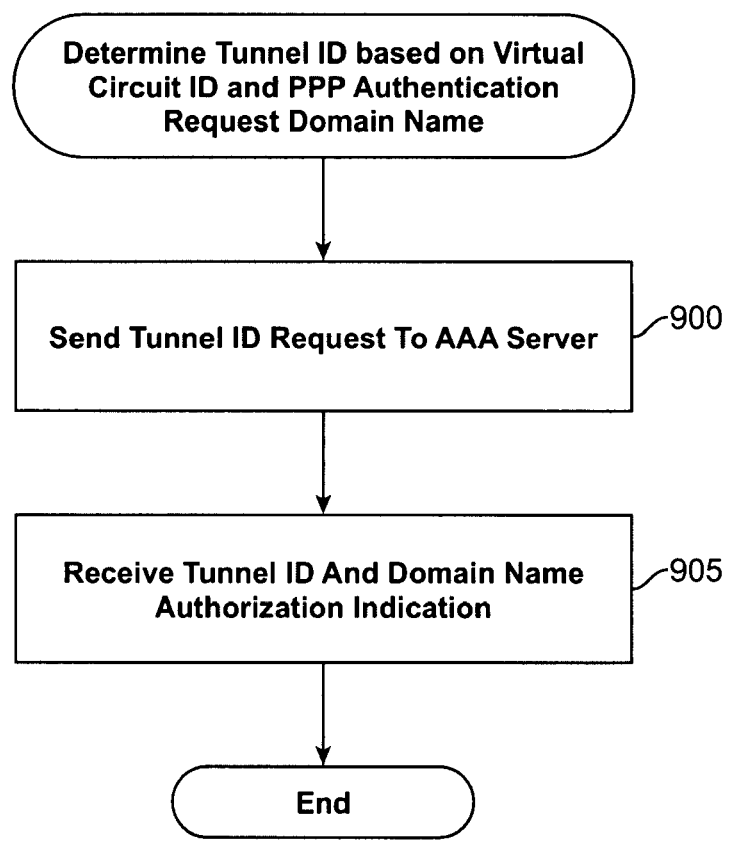
FIG. 9 is a detailed flow diagram that illustrates a method for determining a tunnel ID based on a path ID and a PPP authentication request domain name in accordance with one embodiment of the present invention.
Figure 10:
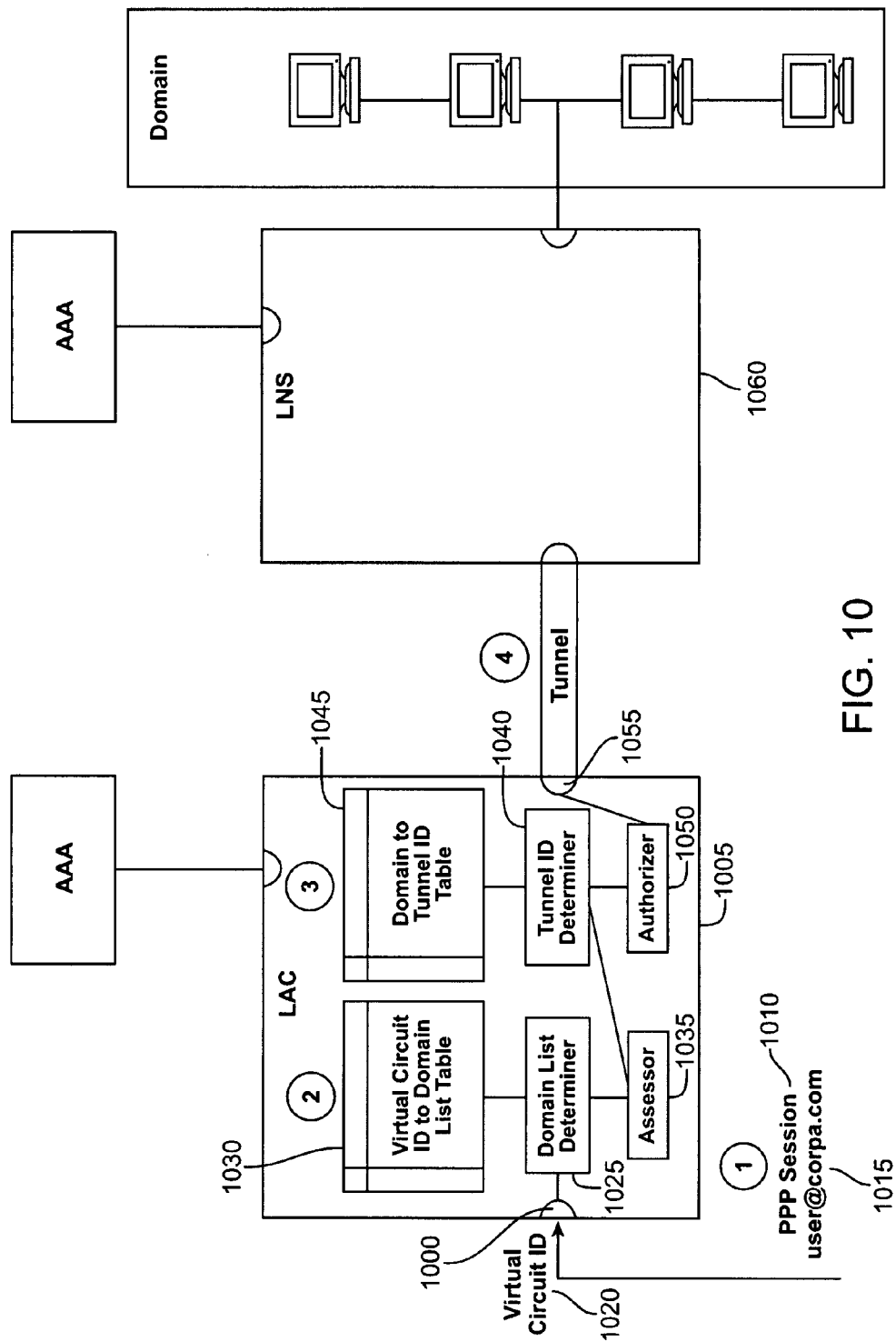
FIG. 10 is a detailed block diagram of a differentiated computer network that has the capability to limit subscriber access to the system to any domain network selected from a local list of domain networks associated with a virtual circuit in accordance with one embodiment of the present invention.
Figure 11:
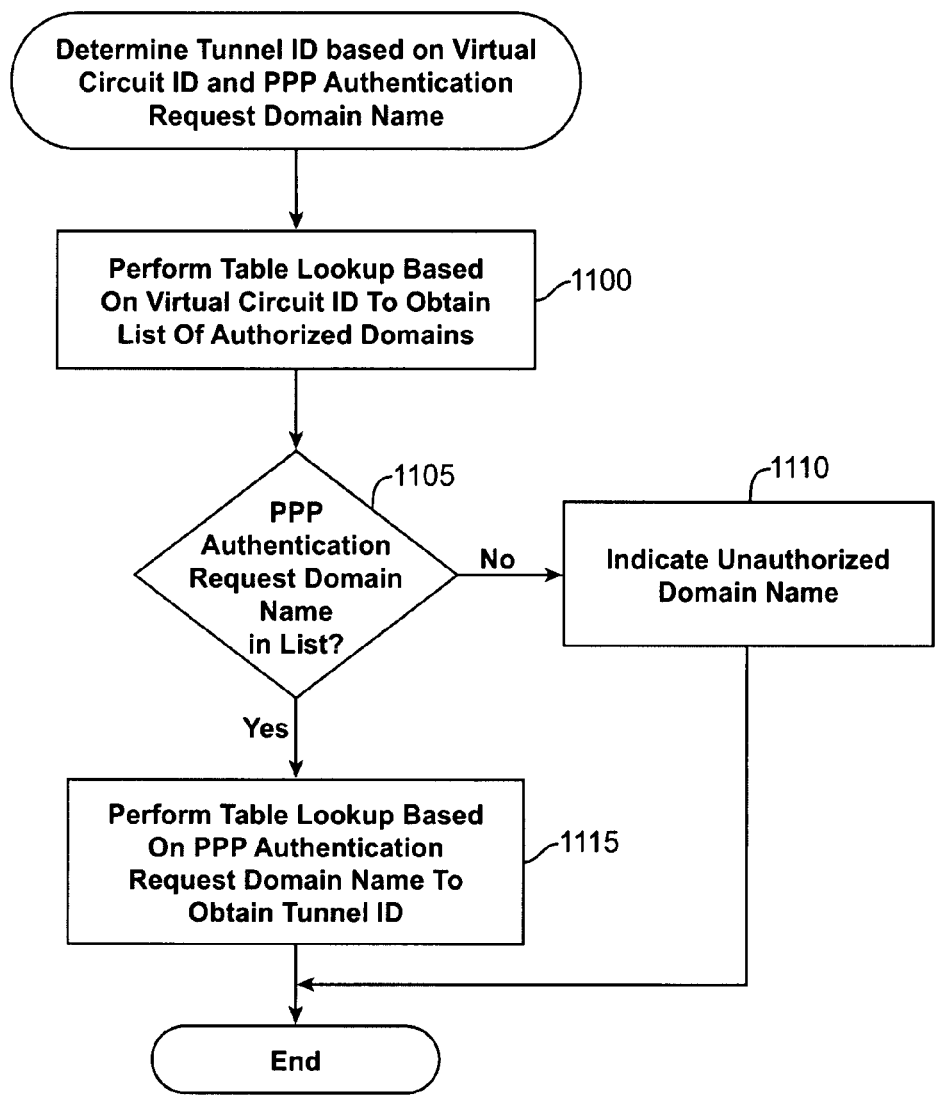
FIG. 11 is a detailed flow diagram that illustrates a method for determining a tunnel ID based on a path ID and a PPP authentication request domain name in accordance with one embodiment of the present invention.

FIGS. 6-11 illustrate three different embodiments of the present invention. FIGS. 6-7 and 8-9 illustrate two embodiments that maintain domain restriction data globally in an AAA server or similar device. The embodiment illustrated by FIGS. 6-7 requires two message exchanges between an AAA server and a LAC device, while the embodiment illustrated by FIGS. 8-9 requires only one message exchange. FIGS. 10-11 illustrate an embodiment of the present invention that maintains domain restriction data locally in a LAC or similar device.

Figure 6:
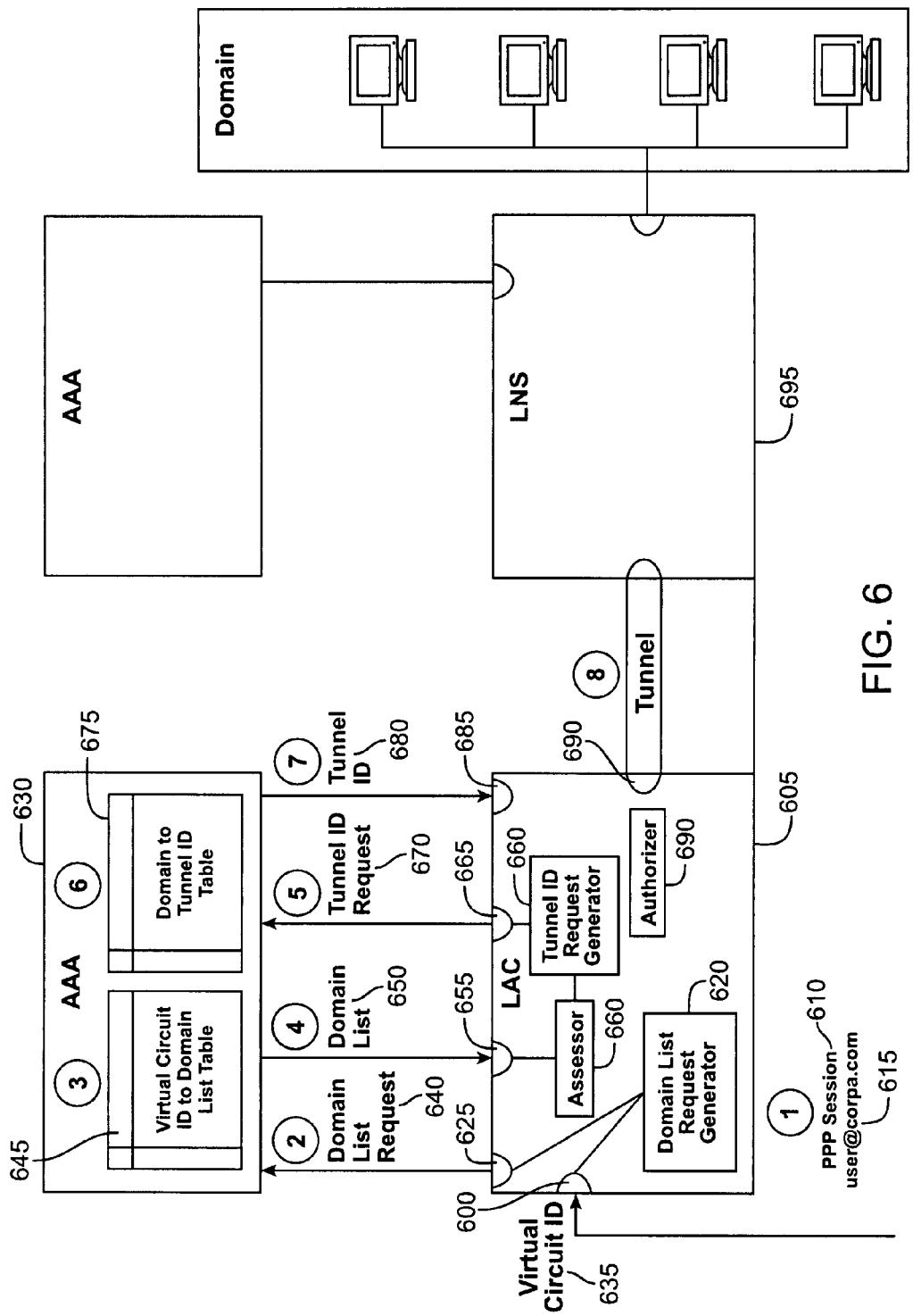
FIG. 6 is a detailed block diagram of a differentiated computer network that has the capability to limit subscriber access to the system to any domain network selected from a global list of domain networks associated with a virtual circuit in accordance with one embodiment of the present invention.

Turning now to FIG. 6, a detailed block diagram of a differentiated computer network that has the capability to limit subscriber access to the system to any domain network selected from a global list of domain networks associated with a virtual circuit in accordance with one embodiment of the present invention is presented. A first receiving interface 600 of LAC 605 receives a PPP authentication request 610. The PPP authentication request 610 includes a domain name 615. The request 610 is received at a particular DSLAM port associated with a virtual circuit identifier such as a VPI/VCI identifier. A domain list request generator 620 generates a domain list request packet and a first forwarding interface 625 sends a request packet to an AAA server 630. The packet includes the virtual circuit identifier 635 associated with the virtual channel used to receive the PPP session 610. The AAA server 630 receives the domain list request 640, performs a table lookup using table 645 to obtain a list of authorized domain names associated with the virtual circuit ID and returns the list of authorized domain names 650. A second receiving interface 655 receives the list of authorized domain names 650. An assessor 660 determines whether the domain identifier 615 is in the list of authorized domain names 650. If the domain name 615 is not in the list of authorized domain names 650, the call is dropped. If the domain name 615 is in the list of authorized domain names 650, a tunnel ID request generator 660 generates a tunnel ID request and a second forwarding interface 665 sends the tunnel ID request 670 to the AAA server 630. The tunnel ID request 670 includes the PPP authentication packet domain name 615. The AAA server 630 receives the tunnel ID request 670, performs a table lookup using table 675 to obtain the tunnel ID associated with the PPP authentication packet domain name 610 and returns the tunnel ID 680. A third receiving interface 685 receives the tunnel ID 680. An authorizer 690 authorizes user access to the domain 610 when the assessor 660 determines access is authorized and when a tunnel ID 680 is received. A third forwarding interface 690 forwards the PPP session 610 to the LNS 695 associated with the tunnel ID 680.

Figure 7:
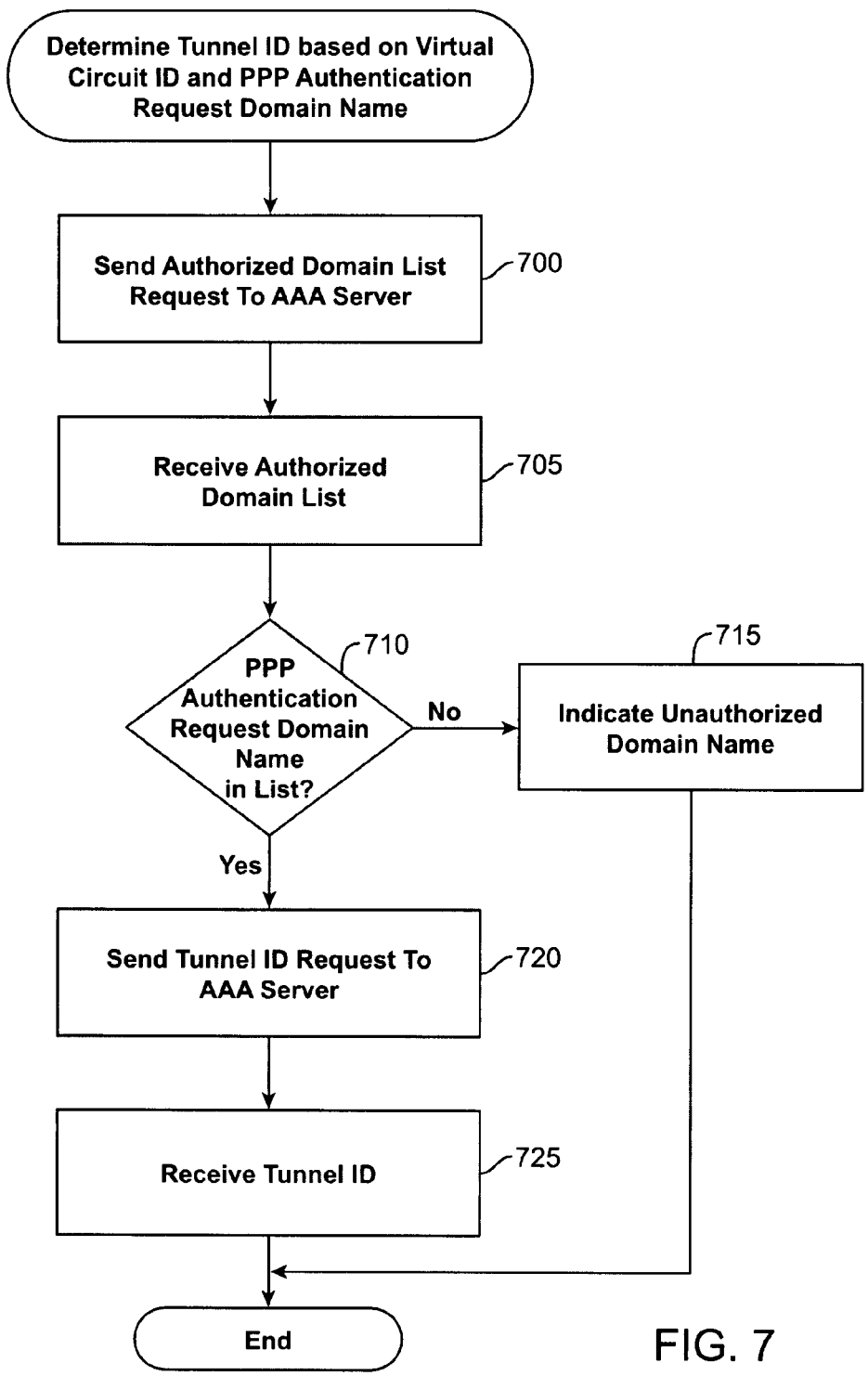
FIG. 7 is a detailed flow diagram that illustrates a method for determining a tunnel ID based on a path ID and a PPP authentication request domain name in accordance with one embodiment of the present invention.

Turning now to FIG. 7, a detailed flow diagram that illustrates a method for determining a tunnel ID based on a path ID and a PPP authentication request domain name in accordance with one embodiment of the present invention is presented. FIG. 7 provides more detail for reference numeral 505 of FIG. 5. At 700, an authorized domain list request including a virtual circuit ID is sent to an AAA server. At 705, a list of authorized domains for the virtual circuit ID is received. At 710, a determination is made regarding whether the PPP authentication request domain name is in the list of authorized domain names. If the domain name is not in the list, an indication that the domain name is unauthorized is made at 715. If the domain name is in the list, at 720, a tunnel ID request including the PPP authentication request domain name is sent to the AAA server. At 725, a tunnel ID associated with the PPP authentication request domain name is received.

FIGS. 8 and 9 illustrate another embodiment of the present invention that maintains domain restriction data globally in an AAA server or similar device. The embodiment requires only one message exchange between an LAC device and an AAA server.

Turning now to FIG. 8, a detailed block diagram of a differentiated computer network that has the capability to limit subscriber access to the system to any domain network selected from a global list of domain networks associated with a virtual circuit in accordance with one embodiment of the present invention is presented. A first receiving interface 800 of LAC 805 receives a PPP authentication request 810 that includes a domain name 850. The request 810 is received at a particular DSLAM port associated with a virtual circuit identifier 815 such as a VPI/VCI identifier. A tunnel ID request generator 820 generates a tunnel ID request 825 and a first forwarding interface 830 sends the tunnel ID request 825 to the AAA server 835. The tunnel ID request 825 includes the virtual circuit ID 815 associated with the virtual circuit used to receive the PPP authentication request 810 and the domain name included in the PPP authentication request 850. An AAA server 835 receives the tunnel ID request 825 and performs a table lookup using table 840 to obtain a list of authorized domain names associated with the virtual circuit ID. An assessor 845 determines whether the domain name included in the PPP authentication request 850 is in the list of authorized domain names. If the domain name 850 is not in the list of authorized domain names, an indication that the domain access is unauthorized is made. If the domain name 850 is in the list of authorized domain names, the AAA server 835 performs a table lookup using table 855 to obtain the tunnel ID 860 associated with the PPP authentication packet domain name 850. The AAA server 835 returns the authorization indication 865 and the tunnel ID 860. A second receiving interface 870 receives the authorization indication 865 and tunnel ID 860. An authorizer 875 authorizes user access to the domain

850 according to the authorization indication 865. A third forwarding interface 880 forwards the PPP session 810 to the LNS 885 associated with the tunnel ID 860. If domain access is unauthorized, the call is dropped.

Turning now to FIG. 9, a detailed flow diagram that illustrates a method for determining a tunnel ID based on a path ID and a PPP authentication request domain name in accordance with one embodiment of the present invention is presented. FIG. 9 provides more detail for reference numeral 505 of FIG. 5. At 900, a tunnel ID request including a virtual circuit identifier such as a VPI/VCI ID and the PPP authentication request domain name are sent to an AAA server. The AAA server determines whether the subscriber access to the domain is authorized. If subscriber access is authorized, the AAA server determines the tunnel ID associated with the domain. At 905, the tunnel ID and an indication of whether the PPP authentication request domain name is authorized are received from the AAA server.

FIGS. 10 and 11 illustrate an embodiment of the present invention that maintains domain restriction data locally in a LAC or similar device. FIG. 10 is a detailed block diagram of a differentiated computer network that has the capability to limit subscriber access to the system to any domain network selected from a global list of domain networks associated with a virtual circuit in accordance with one embodiment of the present invention. A receiving interface 1000 of LAC 1005 receives a PPP authentication request 1010 that includes a domain name 1015. The PPP authentication request request 1010 is received at a particular DSLAM port associated with a virtual circuit identifier 1020 such as a VPI/VCI identifier. An authorized domain list determiner 1025 performs a table lookup using table 1030 to obtain a list of authorized domain names associated with the virtual circuit ID 1020 associated with the virtual channel used to receive the PPP session 1010. An assessor 1035 determines whether the domain name 1015 included in the PPP authentication request 1010 is in the list of authorized domain names. If the domain name 1015 is not in the list of authorized domain names, the call is dropped. If the domain name 1015 is in the list of authorized domain names, a tunnel ID determiner 1040 performs a table lookup using table 1045 to obtain the tunnel ID associated with the PPP authentication packet domain name 1015. An authorizer 1050 authorizes user access to the domain 1015 when the domain name 1015 is in the list of authorized domain names. A forwarding interface 1055 forwards the PPP session 1010 to the LNS 1060 associated with the tunnel ID.

Turning now to FIG. 11, a detailed flow diagram that illustrates a method for determining a tunnel ID based on a path ID and a PPP authentication request domain name in accordance with one embodiment of the present invention is presented. FIG. 11 provides more detail for reference numeral 505 of FIG. 5. At 1100, a table lookup based on a virtual circuit ID such as a VPI/VCI identifier is performed to obtain a list of authorized domain names associated with the virtual circuit ID. At 1105, a determination is made regarding whether the PPP authentication request domain name is in the list of authorized domain names. If the domain name is not in the list, an indication that the domain name is unauthorized is made at 1110. If the domain name is in the list, at 1115, a table lookup based on the domain name is performed to obtain the tunnel ID associated with the domain name.

FIGS. 12-13 are tables that illustrate tunnel configuration information that may be stored in a LAC, an AAA server, or other similar devices in accordance with embodiments of the present invention. FIG. 12 is a table that illustrates associating virtual circuit identifiers 1200 with authorized domain names 1205 in accordance with one embodiment of the present invention. FIG. 13 is a table that illustrates associating domain names 1300 with tunnel identifiers 1305 in accordance with one embodiment of the present invention. In the example, a port having a virtual circuit ID of 10/2 (1210) may establish tunnels with corpA.com (1215, 1310) or corpB.com (1220, 1315), using tunnel IDs 1320 and 1325, respectively.

According to embodiments of the present invention, the information contained in the tables illustrated in FIGS. 12 and 13 is requested by the domain owner to be placed in AAA servers or LACs. It allows the service provider or wholesaler the capability to restrict which domains a PPP session originating from a particular DSLAM port may connect to. This provides added security to the owner of the private domain by lessening the likelihood of an unauthorized access to the home gateway of a corporate intranet. It also allows a wholesaler to charge service providers and subscribers based on which domains are authorized. The service provider or wholesaler would have the control over which ports are allocated to which domains and are, thus, limited to those domains.

Although embodiments of the present invention is have been described with respect to virtual circuits in an ATM networking environment, it should be understood that a virtual circuit assigned to a subscriber in system may be defined in any suitable networking environment using any suitable communication technologies and protocols, without deviating from the scope of the present invention.

In accordance with a specific embodiment of the present invention, the components, process steps, and/or data structures are implemented using software. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. An access server capable of allowing subscribers of a communications system to gain exclusive access to a domain site associated with a virtual circuit, said access server comprising:

a memory device capable of storing a domain list table and a tunnel ID table, said domain list table including a plurality of virtual circuit identifiers and associated domain site identifiers, said tunnel ID table including a plurality of domain names and associated tunnel IDs;

an authorized domain list determiner capable of determining an authorized domain list based upon said domain list table and a domain site identifier with a Point-to-Point Protocol (PPP) authentication request, said PPP authentication request received on a virtual circuit having a virtual circuit identifier;

an assessor capable of determining whether said domain site identifier within said PPP authentication request is in said authorized domain list;

a tunnel ID determiner capable of determining a tunnel ID based upon said tunnel ID table and said domain site identifier; and an authorizer capable of granting subscribers domain site access based upon said authorized domain list.

2. The access server of claim 1, further comprising:

a receiving interface capable of accepting said PPP session authentication request; and a forwarding interface capable of forwarding said PPP session on a tunneling session associated with said tunnel ID.

3. The access server of claim 2 wherein said tunneling session comprises Layer 2 Tunneling Protocol (L2PT) session.

4. The access server of claim 3 wherein said virtual circuit identifier comprises a Virtual Path Identifier (VPI)/Virtual Channel Identifier (VCI).

5. The access server of claim 1 wherein said first receiving interface comprises at least one access multiplexer, each access multiplexer having a plurality of inputs for receiving a service request, each of said inputs being associated with a particular subscriber virtual circuit.

6. A method for controlling subscriber access in a network capable of establishing connections with a plurality of domain sites, comprising:

receiving an L2TP session from a subscriber using a first communication network coupled to at least one other communication network, said L2TP session optionally including a domain site identifier associated with a domain site on said at least one other communication network;

determining whether said subscriber is authorized to access said domain site based upon said domain site identifier and a list of authorized domain sites for a virtual circuit through which said L2TP session is received, said determining comprising:

issuing an authorized domain list request including a virtual circuit identifier;

receiving an authorized domain list that includes domain site identifiers of authorized domain sites for said virtual circuit identifier;

indicating said domain site is unauthorized when said domain site identifier included in said L2TP session is not in said authorized domain list;

indicating said domain site is authorized when said domain site identifier is in said authorized domain list;

issuing a tunnel ID request including said domain site identifier when said domain site is authorized;

receiving a tunnel ID; and assigning said tunnel ID; and authorizing subscriber access to said domain site when said domain site identifier is included in said authorized domain list, wherein said L2TP session is forwarded onto a tunnel associated with said tunnel ID when said subscriber is authorized to access said domain site.

7. The method of claim 6 wherein said authorized domain list request is serviced by an Authentication, Authorization and Accounting (AAA) server; and said AAA server services said tunnel ID request.

8. The method of claim 6 wherein said virtual circuit identifier comprises a VPI/VCI identifier.

9. A method for controlling subscriber access in a network capable of establishing connections with a plurality of domain sites, comprising:

receiving an L2TP session from a subscriber using a first communication network coupled to at least one other communication network, said L2TP session optionally including a domain site identifier associated with a domain site on said at least one other communication network;

determining whether said subscriber is authorized to access said domain site based upon said domain site identifier and a list of authorized domain sites for a virtual circuit through which said L2TP session is received, said determining comprising:

performing a table lookup based on a virtual circuit identifier to obtain an authorized domain list that includes domain site identifiers of authorized domain sites for said virtual circuit identifier;

indicating said domain site is unauthorized when said domain site identifier included in said L2TP session is not in said authorized domain list;

indicating said domain site is authorized when said domain site identifier included in said L2TP session is in said authorized domain list;

performing a table lookup based on said domain site identifier to obtain a tunnel ID when said domain site is authorized; and assigning said tunnel ID; and authorizing subscriber access to said domain site when said domain site identifier is included in said authorized domain list, wherein said L2TP session is forwarded onto a tunnel associated with said tunnel ID when said subscriber is authorized to access said domain site.

10. The method of claim 9 wherein said virtual circuit identifier comprises a VPI/VCI identifier.

11. A program storage device readable by a machine, embodying a program of instructions executable by the machine to perform a method to control subscriber access in a network capable of establishing connections with a plurality of domain sites, the method comprising:

receiving an L2TP session from a subscriber using a first communication network coupled to at least one other communication network, said L2TP session optionally including a domain site identifier associated with a domain site on said at least one other communication network;

determining whether said subscriber is authorized to access said domain site based upon said domain site identifier and a list of authorized domain sites for a virtual circuit through which said L2TP session is received, said determining comprising:

issuing an authorized domain list request including a virtual circuit identifier;

receiving an authorized domain list that includes authorized domain site for said virtual circuit identifier;

indicating said domain site is unauthorized when said domain site identifier included in said L2TP session is not in said authorized domain list;

indicating said domain site is authorized when said domain site identifier included in said L2TP session is in said authorized domain list;

issuing a tunnel ID request including said domain site identifier when said domain site is authorized;

receiving a tunnel ID; and assigning said tunnel ID; and authorizing subscriber access to said domain site when said domain site identifier is included
in said authorized domain list, wherein said L2TP session is forwarded onto a tunnel associated with said tunnel ID when said subscriber is authorized to access said domain site.

12. The method of claim 11 wherein said authorized domain list request is serviced by an AAA server; and said AAA server services said tunnel ID request.

13. The program storage device of claim 11 wherein said virtual circuit identifier comprises a VPI/VCI identifier.

14. A program storage device readable by a machine, embodying a program of instructions executable by the machine to perform a method to control subscriber access in a network capable of establishing connections with a plurality of domain sites, the method comprising:

receiving an L2TP session from a subscriber using a first communication network coupled to at least one other communication network, said L2TP session optionally including a domain site identifier associated with a domain site on said at least one other communication network;

determining whether said subscriber is authorized to access said domain site based upon said domain site identifier and a list of authorized domain sites for a virtual circuit through which said L2TP session is received, said determining comprising:

performing a table lookup based on a virtual circuit identifier to obtain an authorized domain list that includes domain site identifiers of authorized domain sites for said virtual circuit identifier;

indicating said domain site is unauthorized when said domain site identifier included in said L2TP session is not in said authorized domain list;

indicating said domain site is authorized when said domain site identifier included in said L2TP session is in said authorized domain list;

performing a table lookup based on said domain site identifier to obtain a tunnel ID when said domain site is authorized; and assigning said tunnel ID; and authorizing subscriber access to said domain site when said domain site identifier is included
in said authorized domain list, wherein said L2TP session is forwarded onto a tunnel associated with said tunnel ID when said subscriber is authorized to access said domain site.

15. The program storage device of claim 14 wherein said virtual circuit identifier comprises a VPI/VCI identifier.

* * * * *